United States Patent

Stover

[15] 3,638,135

[45] Jan. 25, 1972

[54] INTERMITTENT PHASE CONTROL LOOP FOR SWEPT FREQUENCY PULSE GENERATOR

[72] Inventor: Harris A. Stover, Cedar Rapids, Iowa

[73] Assignee: Collins Radio Company, Cedar Rapids, Iowa

[22] Filed: Oct. 8, 1970

[21] Appl. No.: 79,153

[52] U.S. Cl. ....................................331/14, 331/4, 331/25, 331/178

[51] Int. Cl. ....................................H03b 3/04, H03b 23/00

[58] Field of Search ............................331/4, 14, 18, 25, 178

[56] References Cited

UNITED STATES PATENTS

| | | | |
|---|---|---|---|
| 3,421,112 | 1/1969 | Mortley et al. | 331/14 X |
| 3,382,460 | 5/1968 | Blitz et al. | 331/178 |

*Primary Examiner*—Roy Lake
*Assistant Examiner*—Siegfried H. Grimm
*Attorney*—Richard W. Anderson and Robert J. Crawford

[57] ABSTRACT

A means for generating pulses with precise time-frequency variation embodies a phase locked loop including a precise reference frequency source and a voltage controlled oscillator by means of which an output frequency may be generated precisely in phase and equal in frequency with respect to the precise reference. Control means including a current source the magnitude of which is a predetermined time varying characteristic determines the variation of output frequency from the initial loop controlled value by supplying current, after loop reference disablement, to a capacitor associated with the loop low-pass filter. The voltage thus supplied to the voltage control oscillator effects a predetermined time variation of output frequency during a prescribed output pulse interval.

8 Claims, 5 Drawing Figures

INVENTOR.
HARRIS A. STOVER

BY R. W. Anderson
AGENT

INVENTOR.
HARRIS A. STOVER

BY R. W. Anderson
AGENT

INTERMITTENT PHASE CONTROL LOOP FOR SWEPT FREQUENCY PULSE GENERATOR

This invention relates generally to the generation of output pulses the frequency of which is a particular time varying function and more particularly to a novel means of generating a swept frequency output with the maintenance of closely controlled frequency characteristic throughout the pulse duration.

Requirements may frequently arise for the generation of a single pulse of a swept frequency wherein a very closely controlled frequency characteristic is to be maintained. For example, it might be required that a single pulse lasting one second be linearly swept in frequency from 1,000 Hz. to 2,000 Hz. during the one second period, and that the output frequency during the one second period be within 0.1 Hz. of the required frequency at the beginning of the sweep and within 1 Hz. of the required frequency throughout the remainder of the sweep. This example defines a very precise requirement which is not easily achieved by voltage controlled multivibrators, bridge-type oscillators, or other commonly used generation schemes known in the art.

Accordingly, it is an object of the present invention to provide a means for precisely generating an output signal the initial frequency of which is precisely controlled and the frequency of which during a predetermined period varies as a precisely controlled time function.

The present invention is featured in the provision of a phase locked loop including a precise reference frequency source, an optional mixer and reference frequency divider, and a voltage controlled oscillator by means of which an output frequency may be generated with a precise phase relationship and equal in frequency with respect to the precise reference. Control means including a current source the magnitude of which is a predetermined time varying characteristic determines the variation of the output frequency from the initial loop controlled value by supplying current, after loop reference disablement, to a capacitor associated with the loop filter. The voltage thus supplied to the voltage control oscillator effects a predetermined time variation of output frequency during a prescribed output pulse interval.

These and other features and objects of the present invention will become apparent upon reading the following description with reference to the accompanying drawings in which.

The manner in which the system of the present invention is capable of very precise frequency control will be described by discussing method of operation utilizing frequencies and frequency divider ratios for purpose of exemplification only and not by way of limitation.

Figure 1:
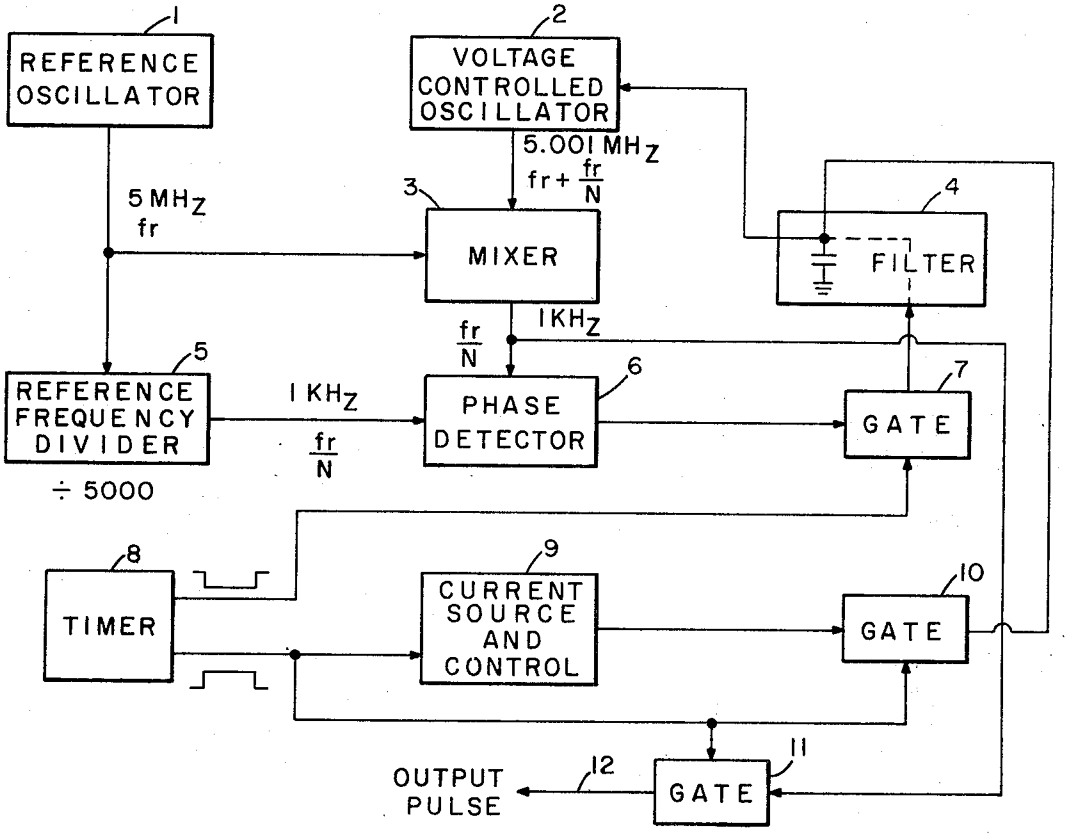
FIG. 1 is a functional block diagram of a frequency generation arrangement in accordance with the present invention.

With reference to FIG. 1, a precise crystal oscillator reference source 1 might be assumed to have an output of 5 MHz with an accuracy of 0.01 percent, or 100 parts per million. One part per million accuracy is well within the state of the art so it may be appreciated that an oscillator with an accuracy of 100 parts per million is relatively easy to obtain. The output of the reference oscillator 1 is applied to a frequency divider illustrated as providing a dividing ratio of 5,000, such that the output from the frequency divider 5 has a frequency of 1,000 Hz. with an accuracy of 0.1 Hz. (0.1 Hz.=0.01% of 1,000 Hz.).

The system of FIG. 1 includes as an output frequency controlling source a voltage controlled oscillator 2 which (let it be assumed for the moment) is chosen to have a frequency of 5.001 MHz. The output of mixer 3 to which the voltage controlled oscillator and reference frequencies are applied will then have a frequency equal to the difference between the two inputs, or 1,000 Hz. It should be emphasized at this point, however, that the output from the voltage controlled oscillator 2 will not have sufficient accuracy that the 1,000 Hz. output of mixer 3 will be within the required 0.1 Hz. Hence the system of FIG. 1 is arranged such that the voltage controlled oscillator 2, mixer 3, phase detector 6, and a filter 4 comprise a phase locked loop to lock the 1,000 Hz. output from mixer 3 90° out of phase with the 1,000 Hz. output from frequency divider 5. The output of mixer 3, therefore, has the same frequency as the output of frequency divider 5, and under these conditions the 1,000 Hz. output from mixer 3 has the required precision at 1,000 Hz.

The phase locked loop comprised of voltage controlled oscillator 2, mixer 3, phase detector 6, and filter 4 is a known expedient in the art. Any discrepancy between the reference 1,000 Hz. output from the frequency divider 5 and the output from mixer 3, as applied to phase detector 6, generates an error signal which is filtered and applied to control the phase and frequency of voltage controlled oscillator 2. The output from mixer 3 is continually adjusted to be equal in frequency and bear a predetermined fixed phase relationship with the reference 1,000 Hz. input to the phase detector from the reference divider 5.

The above defined operation implies that gate 7 is operable, that is, is enabled such that the output from phase detector 6 is passed through the filter 4 to the voltage controlled oscillator 2 in the known operational manner associated with phase locked loops.

The system thus far described is seen to generate an output signal (the output from mixer 3) which is precisely equal in frequency and is phase locked 90° in phase from the signal from the reference frequency divider 5, and which has an accuracy at this frequency defined not by that of the voltage controlled oscillator but by that of the reference frequency divider 5. The output of divider 5 in turn may have any desired degree of accuracy by particular choice of the accuracy of high-frequency reference oscillator and the frequency dividing ratio employed.

In accordance with the present invention this fixed output frequency serves as the starting frequency of a swept or other time variable frequency output sequence. With reference to FIG. 1, the system may include a timer 8 of such a design as to provide proper timing pulses or gates to start and stop the desired variable frequency output pulse. Timer 8 provides an output to gate 7 to pass the output of phase detector 6 to filter 4 and thus selectively enable the phase locked loop. Timer 8 also applies an enabling pulse to gate 10 to selectively apply the output from a current source and control 9 through gate 10 to the loop filter (the significance of which will be further described). Timer 8 additionally may apply an enabling pulse to the output gate 11 so as to pass the output from mixer 3 to the system output line 12 and make the variable frequency pulse available to the user.

The timing pulses would be chosen such that gate 7 is inactivated to prevent the passage of the output from phase detector 6 to filter 4 at the same time that gate 10 is activated to permit the passage of current from the current source and control 9 to filter 4. Prior to the initiation of the swept frequency output pulse all of these gates would be in the reverse condition so that the output from phase detector 6 would be passed to filter 4 to control the frequency and phase of voltage controlled oscillator 2.

Figure 3:
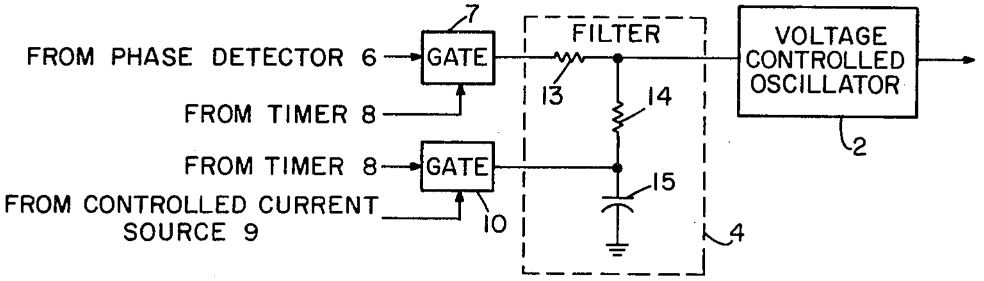
FIG. 3 is a functional schematic of a filter embodiment as might be employed in the system of FIG. 1.

FIG. 3 shows, within the dotted lines, a filter 4 of a type frequently used in phase lock loops. It consists of a series resistor 13 between its input and output terminals, and a second resistor 14 connected from the output terminal in series with a capacitor 15 to ground (or common between input and output ports). Since the voltage control input terminal of voltage controlled oscillator 2 is of a very high impedance, voltage controlled oscillator 2 has an insignificant effect upon the characteristics of the filter. In this application, a second input to filter 4 may be added which connects to the junction between resistor 14 and capacitor 15. When gate 7 is activated to connect the first input of filter 4 to the output of phase detector 6 and gate 10 is inactivated to disconnect the second input to filter 4, the filter 4 performs its normal function as the loop filter of a phase lock loop.

When gate 7 is inactivated to disconnect the first input to filter 4 and gate 10 is activated to connect the second input of filter 4 to current source 9, a change in voltage which is the integral of the current from current source 9 from the time $t_0$ of the start of the pulse to any time $t$ within the pulse period will appear at the output terminals of filter 4.

Upon initiation of the swept frequency output pulse the current to capacitor 15 is supplied from the current source and control 9. Since the voltage across the capacitor is proportional to the charge thereon, the rate of change of voltage across the output of the capacitor is proportional to the rate of change of charge. Therefore, the rate of change of voltage is proportional to the current supplied to the capacitor. Thus the current source and control unit 9 effectively controls the rate of change of frequency of voltage controlled oscillator 2 and, therefore, the rate of change of the frequency of the output from mixer 3 which provides the output of the system. If the current from the current source 9 is zero during the output pulse period, and there are no other currents to or from the capacitor, the output frequency will remain constant. If the output from the current source 9 is a constant other than zero during the pulse period, the output of frequency will change linearly with time, that is, sweep in frequency at a linear rate. This linear rate of change is proportional to the constant current magnitude. Other changes in the output frequency as a function of time may be obtained by providing other selected current pulses as a function of time supplied from the source 9 to the capacitor of filter 4. At the end of the swept frequency pulse period, as determined by the control pulses from timer 8, the condition of all three gates 7, 10, and 11 is reversed which removes the output from output line 12 and restores voltage controlled oscillator 2 to the phase locked condition with the output of the reference frequency divider 5. At the same time the current source 9 is returned to its rest state so that the entire system is ready to provide another variable frequency output pulse whenever timer 8 provides the activating signal.

Figure 2:
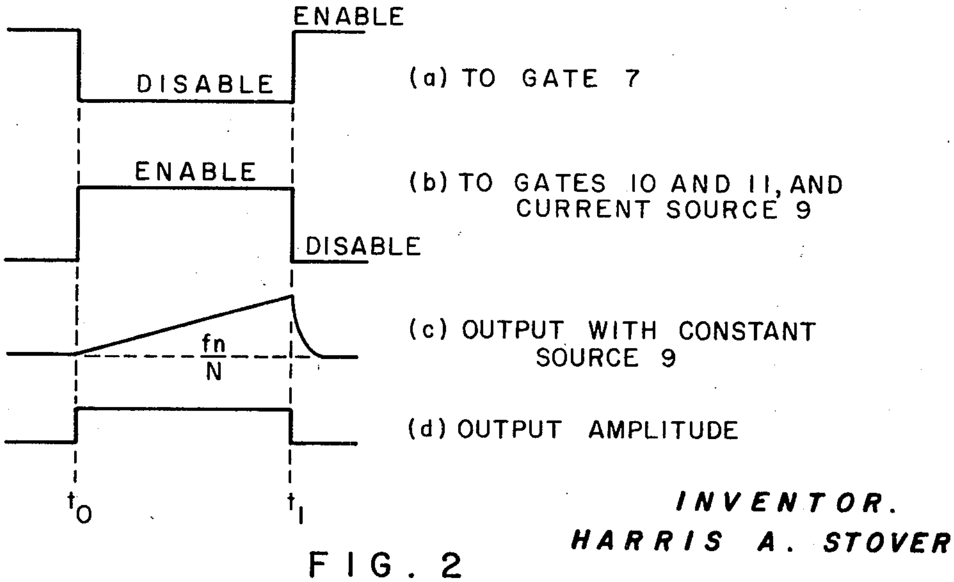
FIG. 2 depicts control waveforms and output signal characteristics associated with the operation of the arrangement of FIG. 1.

FIG. 2 illustrates functionally the operational waveforms as might be applied by timer 8. Between the times $t_0$ and $t_1$ which define the duration of an output pulse or sequence, a control or enabling signal as depicted in waveform A will be applied to disable gate 7 at the same time that an enabling signal (waveform B) is applied to gate 10 to apply the current from source 9 to the capacitor associated with filter 4. The enabling signal which enables gate 10 also enables gate 11 to pass the output from mixer 3 to the output line 12. Waveform C depicts the output frequency as a linear function of time with the assumption that the current source is a constant current source such that the output frequency sweeps linearly from an initial frequency $f_R$/N at a fixed rate dependent upon the magnitude of the constant current source and the size of capacitor 15. Waveform D depicts the amplitude of the output signal.

Generally the phase locked loop is seen to control the initial frequency of the output pulse. During the pulse period the current source 9 accurately controls the rate of change of frequency in accordance with the particular current source function during this period. The two types of control interact to assure that the frequency of the output at the initiation of an output sequence or pulse is a precisely defined and controlled frequency. Since the initial frequency is precisely defined, the particular frequency of the output pulse at any time during the output pulse time interval may be controlled by judicious choice of the current source and control function 9.

The voltage controlled oscillator 2 is normally chosen to have a high frequency relative to the desired output frequency. This makes it much easier to provide an oscillator with the desired frequency vs. control voltage characteristic. Even though the output frequency range $f_2$-$f_1$ may be 2, 5, 10, or more times the initial frequency $f_1$, the frequency range of oscillator 2 may be only a thousandth or less of the initial frequency of oscillator 2. It is relatively easy to construct a voltage controlled oscillator with a linear frequency vs. control voltage characteristic if the frequency range is a small fraction of the operating frequency. It becomes increasingly difficult as the required frequency range becomes a large portion of the operating frequency. For frequencies such as those shown, for example, in FIG. 1, the required frequency vs. control voltage characteristic may be obtained by using a voltage controlled capacitor in the oscillator resonant circuit.

Many form of current control 9 are known within the art. One type which is capable of providing a pulse of current with a constant magnitude within the pulse period is shown within the dashed lines of FIG. 4. Zener diode 16, together with its load resistor 17 provides a reference voltage for one input to differential amplifier 18. Capacitor 19 provides filtering to remove any AC components from this reference voltage. The other input to differential amplifier 18 comes from the junction of resistor 20 and the emitter of transistor 21. One of the inputs to differential amplifier 18 is the reference voltage across zener diode 16 while its other input is the voltage drop across resistor 20. The output of differential amplifier 18 is applied to the base of transistor 22 of the Darlington connected transistor pair 22, 23 in such a way as to cause the current through transistor 23 to increase if the voltage drop across resistor 20 is less than the reference voltage across zener diode 16 and to cause the current through transistor 23 to decrease if the voltage drop across resistor 20 is more than the reference voltage across zener diode 16. Differential amplifier 18 controls transistors 22 and 23 so that the differential voltage input to amplifier 18 approaches zero. Therefore, the voltage across resistor 20 is maintained equal to the reference voltage $V_{ref}$ of zener diode 16. This provides a constant current output from the collector of transistor 23 which is equal to the voltage $V_{ref}$ of zener diode 16 divided by the resistance of resistor 20. Transistor 21 permits the current source to be disabled when it is desired to not have a current output. When a positive voltage is applied from timer 8 to the base of transistor 21, the transistor appears as a low resistance to ground from the load end of resistor 20. This causes the voltage drop across resistor 20 to be much greater than the reference voltage across zener diode 16. Differential amplifier 18 controls the base of transistor 22 in an attempt to reduce the current through resistor 20 and, therefore, the voltage drop across resistor 20. Since the voltage drop across resistor 20 still exceeds the reference voltage across zener diode 16 when the current through transistor 23 is completely cut off, a positive voltage applied to the base of transistor 21 will stop the flow of current from the controlled current source. If a negative voltage is applied to the base of transistor 21 from timer 8, the transistor will represent a very high resistance between its emitter and collector and have insignificant effect upon the voltage drop across resistor 20 so that the output current from the controlled current source 9 will be equal to the voltage $V_{ref}$ of zener diode 16 divided by the resistance of resistor 20.

Figure 4:
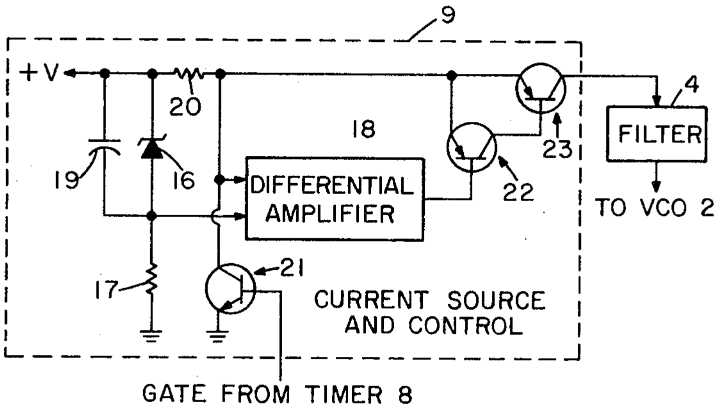
FIGS. 4 and 5 are functional schematics of exemplary current source and control embodiments as might be employed in the system of FIG. 1.

The constant current source of FIG. 4 when used in the circuit of FIG. 1 will cause a linear swept frequency pulse at the output 12 of the circuit of FIG. 1. Note that if the reference voltage across the zener diode 16 of FIG. 4 is replaced by a voltage which is a function of time, the current output will be proportional to that same function of time. Under these conditions, the frequency change of the circuit of FIG. 1 during the pulse period will be proportional to the integral of that function of time. To further illustrate this, consider the circuit of FIG. 5. In this figure the reference voltage, represented by the voltage across zener diode 16 in FIG. 4, is represented by the voltage across capacitor 24. Therefore, the output current from transistor 23 as a function of time is proportional to the voltage across capacitor 24 as a function of time.

Figure 5:
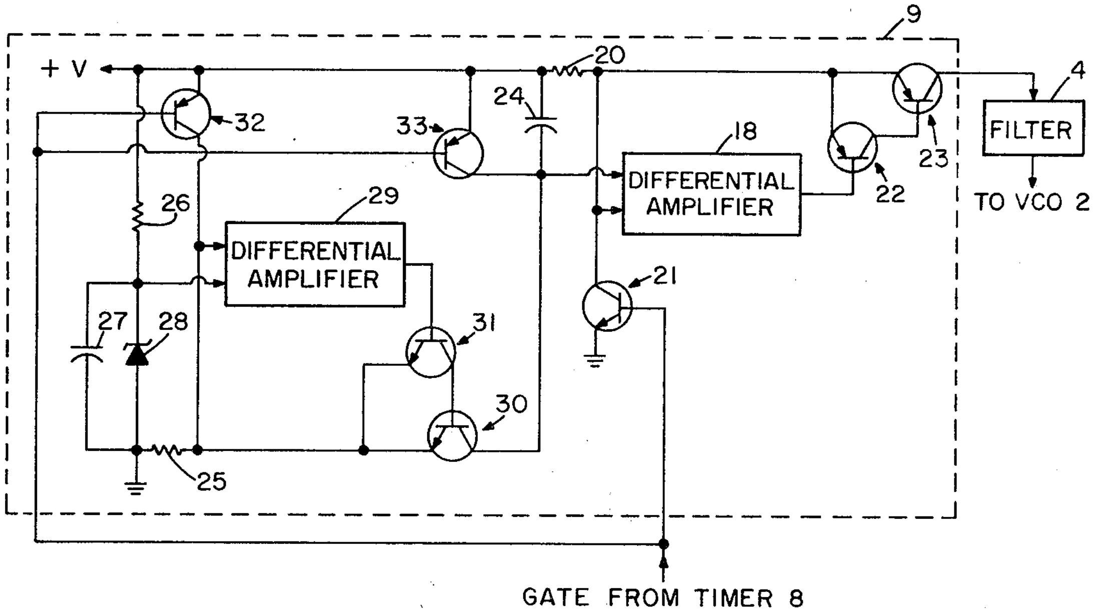

In FIG. 5 resistors 25 and 26, capacitor 27, zener diode 28, differential amplifier 29, and transistors 30 and 31 constitute a constant current source analogous to that of FIG. 4 so that the detailed description will not be repeated. When this portion of the circuit is supplying current to capacitor 24, the bases of transistors 32 and 33 are biased more positive than their emitters so that the transistors are cutoff and have insignificant effect upon the operation of the constant current source. Under this condition the charging current into capacitor 24 is equal to the reference voltage across zener diode 28 divided by the resistance of resistor 25. During the time when it is not desirable to supply current, the bases of transistors 32 and 33 are biased negatively with reference to their emitters causing them to appear as low resistance between their collectors and emitters. The low resistance of transistor 32 causes a large voltage drop across resistor 25 which causes the differential amplifier 29 to cut off the current through transistor 30. The low resistance of transistor 33 discharges capacitor 24 so that when a pulse is initiated there will be no initial voltage across capacitor 24 and the voltage across capacitor 24 will increase linearly with time during the pulse. Prior to initiation of a pulse the transistors 21, 32, and 33 are biased to conduction and, therefore, there is no current through transistors 23 or 30 and capacitor 24 is discharged. Upon initiation of a pulse each of the transistors 21, 32, and 33 is cut off causing a constant current to flow through transistor 30 which causes a linearly increasing voltage drop to appear across capacitor 24, which in turn causes a linearly increasing current to pass through output transistor 23. This linearly increasing current through output transistor 23 causes the voltage across capacitor 15 of filter 4 to be a parabolic function of time. Therefore, the output frequency of the circuit of FIG. 1, when employing the current source and control 9 of FIG. 5 and the filter 4 of FIG. 3 will be a parabolic function of time.

It might be noted that the functioning of gate 10 of FIG. 1 is inherently included in the operation of the current source and control embodiments of FIGS. 4 and 5, thus each of FIGS. 4 and 5 depicts the output from current source 9 as being applied directly to filter 4.

The present invention thus provides means for generating an output pulse the frequency of which varies as a predetermined and selectable function of time and the initial frequency of which is precisely defined. In the considered example of a constant current source 9, a linearly swept frequency output may be controlled in an exacting manner since the initial frequency is precisely defined and the constant current source as applied to the capacitor developing the controlling voltage for the voltage controlled oscillator in the loop inherently defines a linear increase in voltage across the capacitor and, therefore, linear control of the voltage controlled oscillator.

Although the present invention has been described with respect to particular embodiments thereof, it is not to be so limited, as changes may be made therein which fall within the scope of the invention as defined in the appended claims.

I claim:

1. Means for generating an output carrier pulse the frequency of which is a predetermined function of time and the initial frequency of which is precisely determined, comprising a phase locked loop including a voltage controlled oscillator, a phase detector, and a filter, means for applying the output from said voltage controlled oscillator and a reference frequency source as respective inputs to said phase detector, the output from said phase detector being applied to said filter, said filter developing an output voltage for application to said voltage controlled oscillator for control of the frequency thereof, control means for selectively disabling said phase locked loop by disconnecting the output from said phase detector from said filter, a current source, said control means applying said current source to said filter means during the disablement of said phase locked loop, said filter comprising means responsive to said current source to alter the control voltage output of said filter, whereby an output pulse is generated by said voltage controlled oscillator upon the initiation of said disablement the initial frequency of which corresponds precisely to that of said reference frequency source, the variation of frequency of said output pulse for the duration of said output pulse being accurately defined throughout the pulse period as a function of said current source.

2. A pulse generating means as defined in claim 1 wherein the current source response means of said filter means comprises a capacitor the voltage across which comprises the controlling voltage for said voltage controlled oscillator, the output of said current source being applied so as to provide charging current for said capacitor whereby the frequency of said voltage controlled oscillator is a function of the magnitude of said current source for the time duration of application of said source to said capacitor.

3. A pulse generating means as defined in claim 2 further comprising a signal mixing means one input of which comprises the output from said voltage controlled oscillator and the other input of which comprises the output from said reference frequency source, frequency dividing means receiving the output from said reference frequency source and providing a first output to said phase detector, and the output from said mixer providing a second input to said phase detector and comprising said output carrier pulse.

4. A pulse generating means as defined in claim 3 further comprising a first gating means connected between the output from said phase detector and the input to said loop filter, a second gating means associated with said current source, said control means being adapted to simultaneously disable said first gating means and enable said second gating means at a time corresponding to the initiation of a frequency controlled output pulse.

5. Signal generating means as defined in claim 4 further comprising a third gating means through which the output from said signal mixing means is selectively applied to an output terminal, said control means further comprising means to enable said third gating means simultaneously with the enablement of said second gating means, whereby said output pulse is applied to said output terminal only during that period of time corresponding to the selected duration of said output pulse.

6. Means for generating an output carrier pulse the initial frequency of which corresponds to a predetermined frequency and the variation from said initial frequency with time of which corresponds to a selected time function, comprising a phase locked loop including a reference frequency source, a voltage controlled oscillator, and a phase detector comparing the output from said reference frequency source and said voltage controlled oscillator, means for selectively enabling said phase locked loop, said phase locked loop when enabled functioning to lock the output from said voltage controlled oscillator in frequency and phase with respect to said reference frequency source, means for selectively disabling said phase locked loop and controlling the frequency of said voltage controlled oscillator by a predetermined voltage function for a predetermined time interval the duration of which corresponds to the duration of an output pulse from said system, said phase locked loop comprising a low pass filtering means to which the output from said phase detector is selectively applied and including a capacitor the voltage across which is applied to said voltage controlled oscillator for frequency control thereof, and said predetermined time function comprising a current source the magnitude of which is a predetermined time function, said current source being applied to supply charging current for said filter capacitor upon the disablement of said phase locked loop, and the output from said system comprising the output from said voltage controlled oscillator.

7. Means as defined in claim 6 further comprising a signal mixing means one input of which comprises the output from said voltage controlled oscillator and the other input of which comprises the output from said reference frequency source, frequency dividing means receiving the output from said reference frequency source and providing a first input to said phase detector, and the output from said mixer providing a second input to said phase detector and comprising said output carrier pulse.

8. Means as defined in claim 7 wherein said current source comprises a constant current source whereby the frequency of said output pulse increases as a linear function with time.

* * * * *